(12) United States Patent
Samuelson

(10) Patent No.: US 7,082,827 B1
(45) Date of Patent: Aug. 1, 2006

(54) LEAK DETECTOR

(76) Inventor: Scott R. Samuelson, 1357 Calle Christopher, Encinitas, CA (US) 92024

( * ) Notice: Subject to any disclaimer, the term of this patent is extended or adjusted under 35 U.S.C. 154(b) by 155 days.

(21) Appl. No.: 10/600,899

(22) Filed: Jun. 19, 2003

(51) Int. Cl.
G01F 2/30 (2006.01)
G01F 23/56 (2006.01)
G01F 23/76 (2006.01)

(52) U.S. Cl. .......................... 73/308; 73/319; 73/322.5

(58) Field of Classification Search .............. 73/307, 73/308, 322.5, 319, 305; 33/719, 717
See application file for complete search history.

(56) References Cited

U.S. PATENT DOCUMENTS

| | | | | | |
|---|---|---|---|---|---|
| 25,828 | A | * | 10/1859 | Hoyt | 137/213 |
| 41,480 | A | * | 2/1864 | Carey | 73/307 |
| 44,118 | A | * | 9/1864 | Smith et al. | 73/319 |
| 930,171 | A | | 8/1909 | Foley | |
| 1,193,744 | A | * | 8/1916 | Wilkinson | 73/311 |
| 1,457,055 | A | * | 5/1923 | Brewington | 73/322.5 |
| 1,522,630 | A | * | 1/1925 | Ireland | 73/322.5 |
| 1,676,565 | A | * | 7/1928 | Vallee et al. | 73/307 |
| 1,714,733 | A | * | 5/1929 | Shank | 73/322.5 |
| 1,950,191 | A | * | 3/1934 | Gwynne | 73/322.5 |
| 2,009,648 | A | * | 7/1935 | Carlson | 73/322.5 |
| 2,327,299 | A | * | 8/1943 | Yablin | 427/376.5 |
| 2,401,312 | A | * | 6/1946 | McCarty | 137/400 |
| 2,457,905 | A | * | 1/1949 | Korody | 73/322 |
| 2,496,518 | A | * | 2/1950 | Candler | 137/174 |
| 2,510,663 | A | * | 6/1950 | Schuessler | 73/311 |
| 2,571,808 | A | * | 10/1951 | Aldinger, Jr. | 43/44.91 |
| 2,661,410 | A | * | 12/1953 | Luezko | 200/84 R |
| 2,672,693 | A | * | 3/1954 | Cannell | 33/719 |
| 2,719,196 | A | * | 9/1955 | Galileo | 200/84 R |
| 2,736,013 | A | * | 2/1956 | Binford | 340/625 |
| 2,761,467 | A | * | 9/1956 | Christian | 73/322.5 |
| 2,847,762 | A | * | 8/1958 | Quist | 33/719 |
| 2,985,187 | A | | 5/1961 | Hamilton | |
| 3,153,932 | A | * | 10/1964 | Jonson et al. | 73/309 |
| 3,289,477 | A | * | 12/1966 | Taylor et al. | 73/322.5 |
| 3,374,326 | A | * | 3/1968 | Eisendrath | 200/84 R |
| 3,460,386 | A | * | 8/1969 | Guignard | 73/290 R |
| 3,538,745 | A | * | 11/1970 | Ginsburgh et al. | 73/305 |
| 3,984,877 | A | * | 10/1976 | Kirby | 4/314 |
| 4,081,638 | A | * | 3/1978 | Thorn et al. | 200/84 R |
| 4,321,751 | A | * | 3/1982 | Johnson et al. | 33/701 |
| 4,398,186 | A | | 8/1983 | Statz | |
| 4,421,459 | A | * | 12/1983 | Frey | 417/38 |

(Continued)

FOREIGN PATENT DOCUMENTS

DE 3535624 A1 * 4/1987

*Primary Examiner*—Hezron Williams
*Assistant Examiner*—John Fitzgerald
(74) *Attorney, Agent, or Firm*—Timothy N. Ellis

(57) ABSTRACT

An example of an apparatus for detecting the lowering of a top surface of a liquid includes a housing that has a housing hole, and an insertion member attached to the housing. A dowel is inserted into the housing hole, and a float is attached to the dowel. A detector switch that has an actuator arm is also attached to the housing, with the actuator arm of the detector switch located proximate a first end of the dowel. An audio transducer is attached to the housing, to sound an alarm if the first end of the dowel does not push the actuator arm to a position near the body of the detector switch, for example due to the lowering of the top surface of a liquid in which the float is placed.

3 Claims, 16 Drawing Sheets

U.S. PATENT DOCUMENTS

| | | | |
|---|---|---|---|
| 4,554,494 A | * 11/1985 | Howeth | 318/482 |
| 4,591,837 A | 5/1986 | Martinez | |
| 4,757,305 A | * 7/1988 | Peso | 340/624 |
| 4,988,978 A | * 1/1991 | Soto | 340/624 |
| 5,124,686 A | * 6/1992 | White et al. | 340/624 |
| 5,144,700 A | * 9/1992 | Martin | 4/415 |
| 5,150,614 A | * 9/1992 | Urich | 73/308 |
| 5,315,529 A | 5/1994 | Farmer | |
| 5,485,866 A | * 1/1996 | Bowen | 137/554 |
| 5,515,883 A | 5/1996 | Bouzaglou | |
| 5,744,701 A | 4/1998 | Peterson et al. | |
| 5,814,830 A | * 9/1998 | Crowne | 250/577 |

* cited by examiner

LEAK DETECTOR

BACKGROUND

1. Technical Field

The present invention relates to detecting a leak. More particularly, the invention concerns an apparatus for detecting a leak of a liquid, by detecting a lowering of the top surface of the liquid.

2. Description of Related Art

Drain pipes, which may be called waste lines, are commonly installed during the construction of buildings and paved areas. Waste lines may be used in various types of drain systems, which may include, for example, sewer, lab, kitchen, or other types of drain systems. Pipes used for waste lines may be made of various materials, including cast iron or plastic, and in some instances double containment pipes that include an inner pipe and an outer pipe may be used.

Waste lines often include horizontal pipes that are placed in trenches in the ground, and vertical pipes (which may be called vertical risers or vent pipes) that are connected to the horizontal pipes. A concrete slab may be formed over the pipes in the trenches, and the vertical pipes may be connected to various locations in a building. After waste lines are installed, for example by placing pipes in trenches and attaching vent pipes, a building inspector usually tests the waste lines to make sure they hold water.

In preparation for the building inspector's test, the ends of the waste lines are capped to make them water tight, and a ten foot vertical pipe is attached to the waste lines. The ten foot vertical pipe is used to create head pressure in the waste lines when the ten foot vertical pipe and the waste lines are filled with water. To conduct the test, the ten foot vertical pipe and the waste lines are filled with water, and if the water level in the ten foot vertical pipe does not drop after fifteen minutes, the waste lines are "signed off" by the building inspector.

After the waste lines are approved by the building inspector, typically the pipes in the trenches are covered with dirt and the trenches are filled with dirt, in a process called back filling. Frequently, sand and rock are placed on the dirt to form a final sub grade, and then concrete is poured on the sand and rock to form a concrete slab.

Pipes in the waste lines are often damaged during construction after the waste lines are approved by the building inspector. Various construction activities can result in damage to waste lines. For example, waste lines can be damaged by back filling machines or shovels used during back filling, or when electrical lines are placed underground, or when screed pins are installed to indicate the top surface of the slab, or if workers lean on vent pipes, or by vandals. In many instances, leaks in the waste lines are not discovered until after the slab has been poured, because workers may be unaware that the waste lines have been damaged, or because subcontractors may be uneager to disclose that they have damaged the waste lines.

The existence of damage to waste lines is difficult to observe because the damage to the waste lines, and the water that may leak from the damaged waste lines, are usually hidden beneath back fill and the final sub grade. Also, because leaks are often not discovered until after the slab has been poured, it is difficult to determine who is responsible for the damage. Locating and repairing leaks in waste lines after the slab has been poured is frequently very costly and can result in significant delays in construction. For example, finding a leak may require saw cutting, and breaking and removing many portions of the slab until one or more leaks are found. Consequently, it is desirable to detect and repair leaks in waste lines before the slab is poured. However, existing techniques do not adequately detect leaks in waste lines during the construction process before a slab is poured.

SUMMARY

One aspect of the invention is an apparatus for detecting the lowering of a top surface of a liquid. An example of the apparatus includes a housing that has a housing hole, and an insertion member attached to the housing. The apparatus also includes a dowel that has a first end and a second end, and that defines a dowel longitudinal axis. The dowel is inserted into the housing hole in the housing, and a float is attached to the dowel. The apparatus further includes a detector switch that has an actuator arm. The detector switch is attached to the housing, with the actuator arm of the detector switch located proximate the first end of the dowel. The apparatus also includes an audio transducer attached to the housing.

Another aspect of the invention is a method for detecting a leak. An example of the method includes orienting a longitudinal axis of a pipe substantially vertically, wherein the pipe has a top end, a bottom end, and a bore. The method also includes capping all openings that are in fluid communication with the bore of the pipe and that are lower than a first prescribed distance from the top end of the pipe. The pipe is filled with a liquid until a top surface of the liquid is no lower than a second prescribed distance from the top end of the pipe. The method also includes placing a float in the liquid, and detecting if the float moves at least a third prescribed distance towards the bottom end of the pipe. Responsive to detecting that the float has moved at least the third prescribed distance towards the bottom end of the pipe, a leak indicator is activated. Other aspects of the invention are described in the sections below.

The invention provides a number of advantages. For example, the invention provides the advantage of immediately detecting when a leak occurs in waste lines before (and after) a slab is poured. The invention provides the additional benefit of facilitating identifying the location of a leak and the cause of a leak. The invention also provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings.

I. Hardware Components and Interconnections

A. Operative Environment

Figure 1:
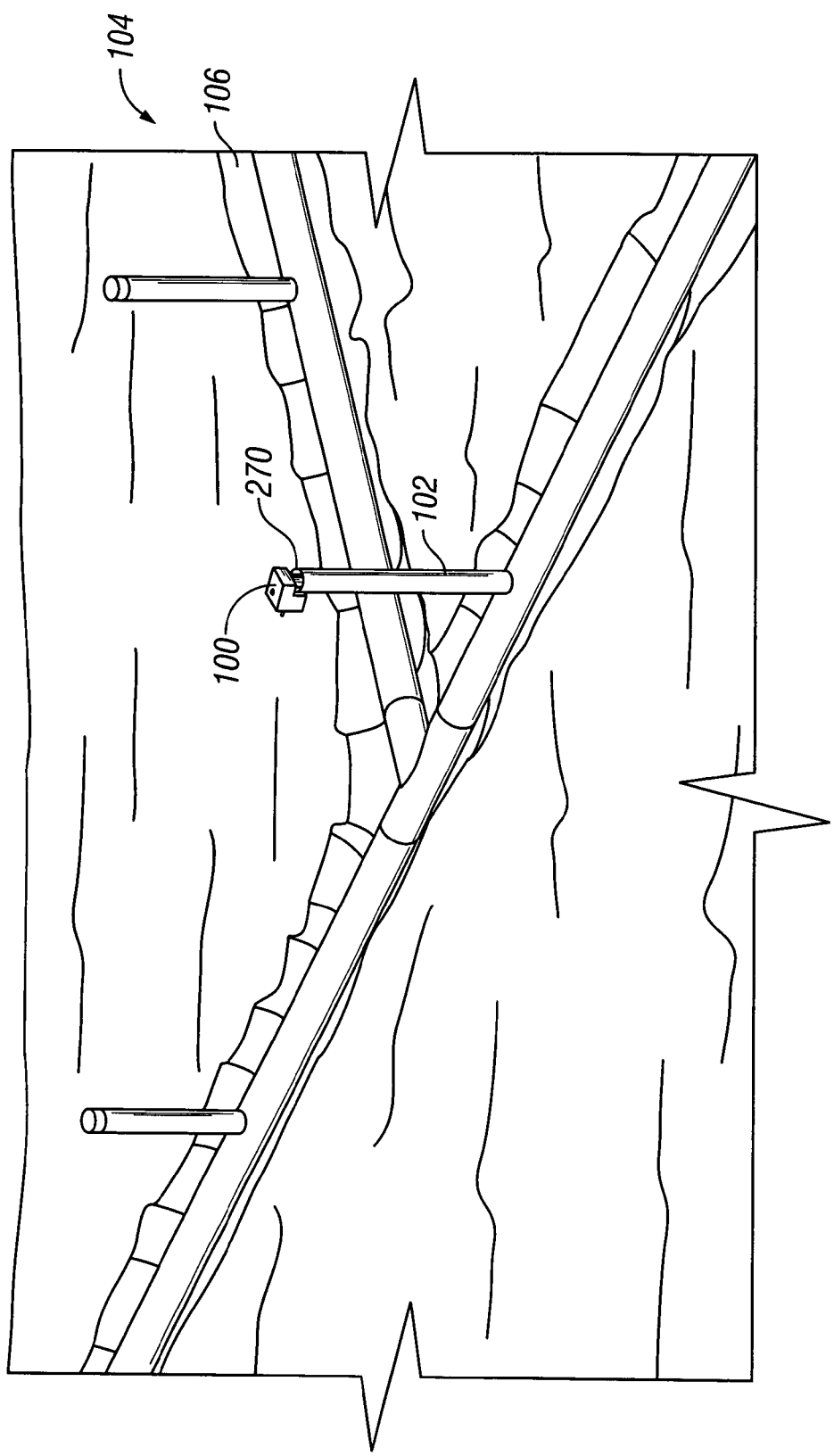
FIG. 1 is a view of a leak detector in an operative environment in accordance with an exemplary embodiment of the invention.

One aspect of the invention is an apparatus for detecting a leak. As an example, the apparatus may be embodied by a leak detector 100, which is shown in FIG. 1 in an example of its operative environment. In FIG. 1 the leak detector 100 is shown placed on the top end 270 of a pipe 102, which is attached to a pipe network 104. The longitudinal axis of the pipe 102 is oriented substantially vertically. As an example, the pipe 102 and the pipe network 104 may be waste lines, and the pipe network 104 may be located in a trench 106 in the ground at a construction site.

B. First Example of Leak Detector

Figure 2:
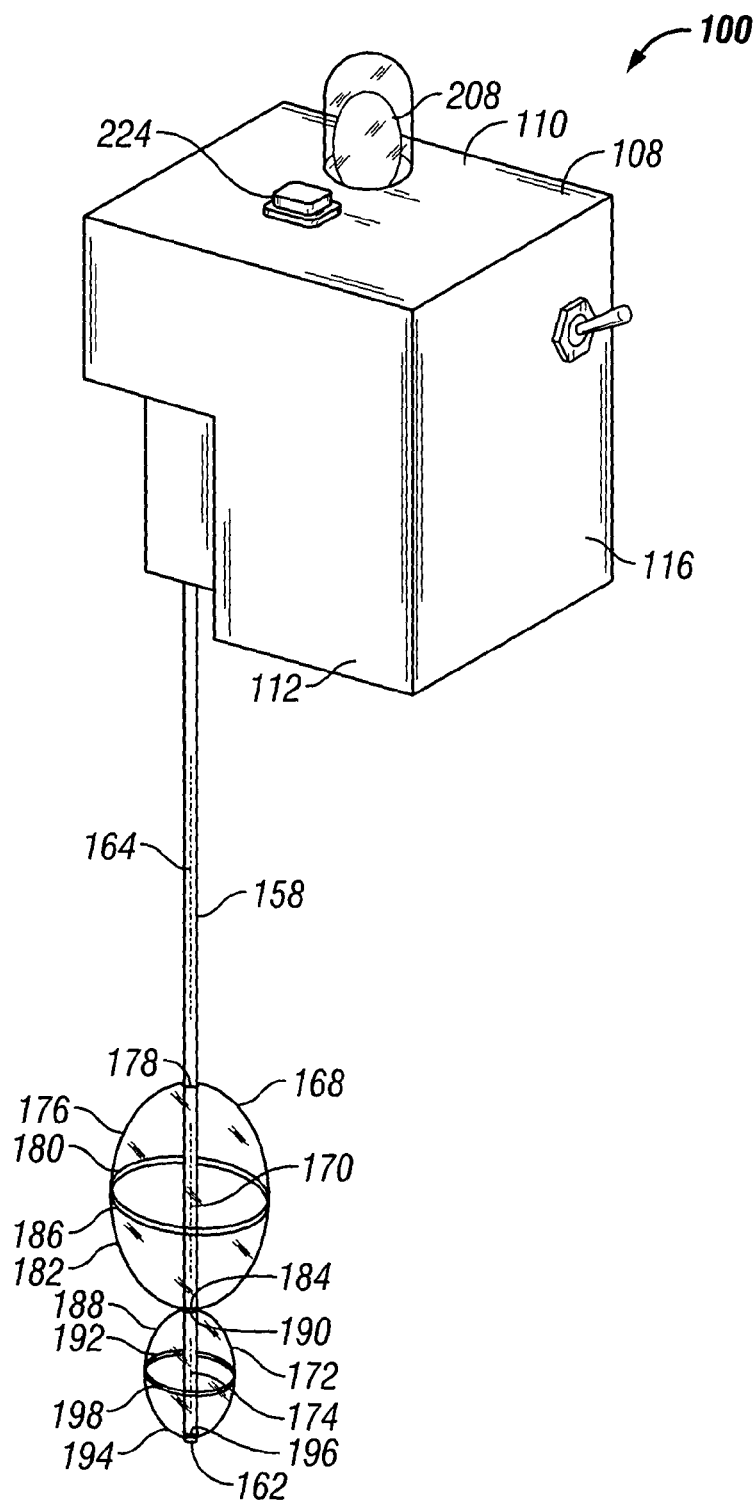
FIG. 2 is a perspective view of a leak detector in accordance with an exemplary embodiment of the invention.
Figure 3:
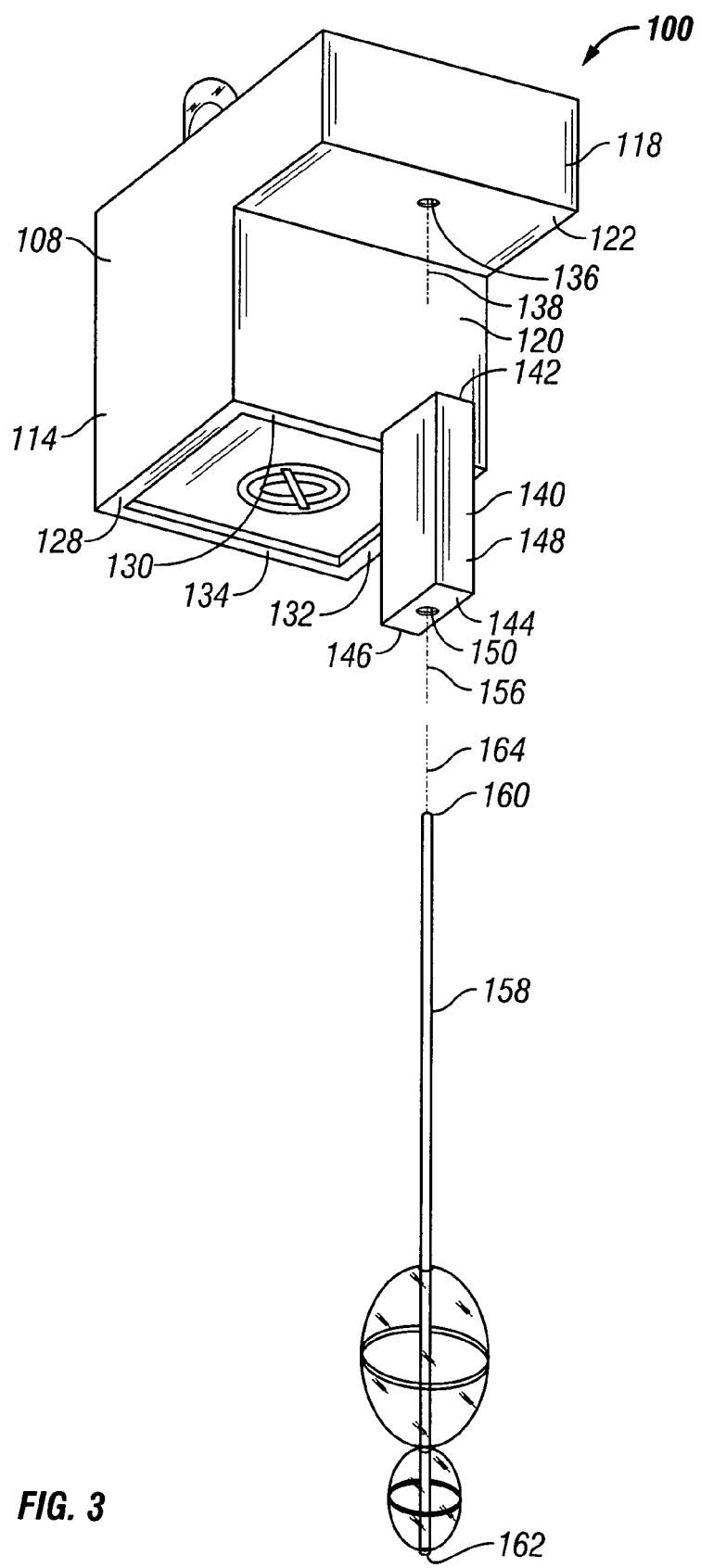
FIG. 3 is an exploded perspective view of a leak detector in accordance with an exemplary embodiment of the invention.
Figure 4:
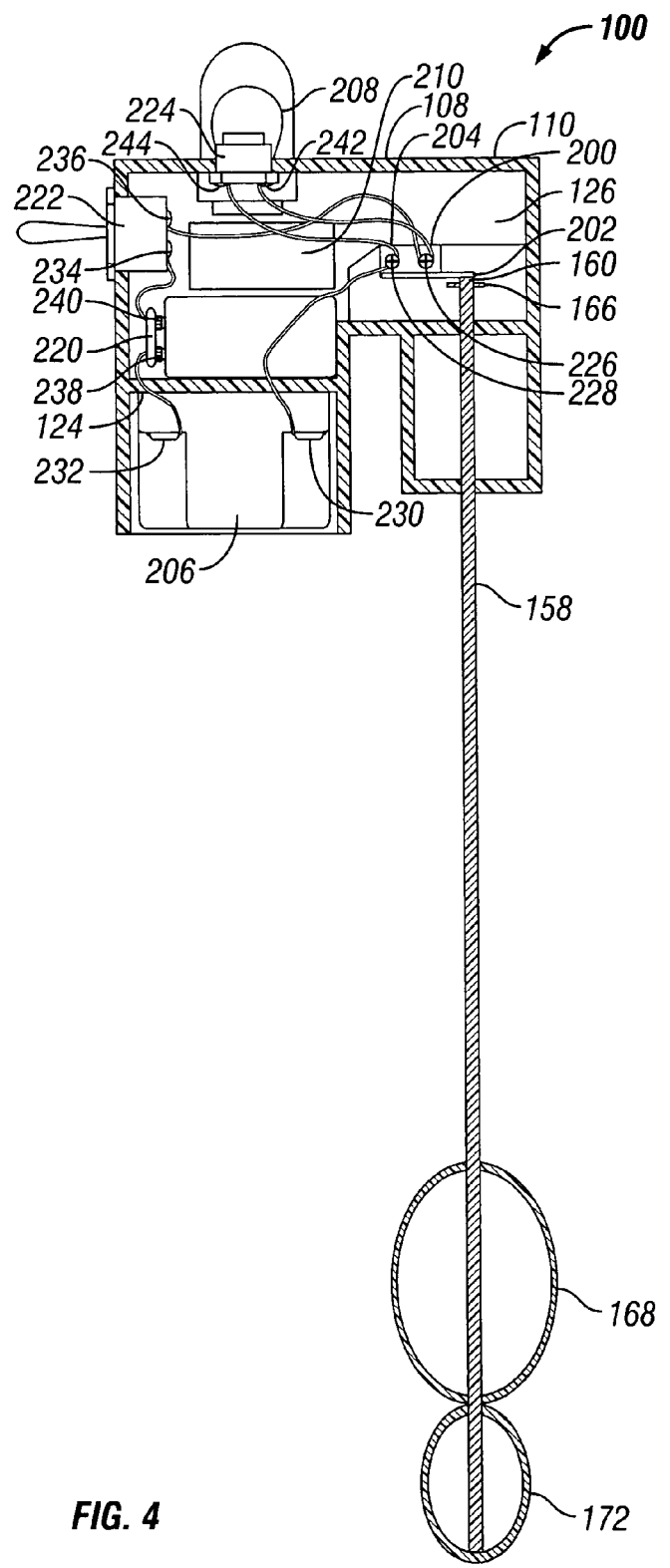
FIG. 4 is a sectional view of a leak detector in accordance with an exemplary embodiment of the invention.

The components and interconnections of the leak detector 100 are shown in more detail in FIGS. 2, 3 and 4. The leak detector 100 may alternatively be referred to as an apparatus for detecting a plumbing leak, or as an apparatus for detecting a leak in a plumbing system, or as an apparatus for detecting a leak in waste lines, or as an apparatus for detecting the lowering of the level of a liquid, or as an apparatus for detecting the lowering of the top surface of a liquid, or as an apparatus for detecting a decrease of the quantity of a liquid. In one example the leak detector 100 may be used to detect a leak in waste lines and may be called a pre slab leak detector. Although the leak detector 100 may be called a pre slab leak detector, the leak detector 100 may be used to detect leaks both before and after a slab is poured over waste lines. The leak detector 100 may also be used to detect leaks in other containers, vessels, or plumbing.

Referring to FIGS. 2, 3 and 4, the leak detector 100 includes a housing 108 that has a top 110 (FIG. 2), a first side 112 (FIG. 2), a second side 114 (FIG. 3), a front 116 (FIG. 2), a back 118 (FIG. 3), a lateral surface 120 (FIG. 3), a ledge 122 (FIG. 3), a bottom 124 (FIG. 4), and an interior 126 (FIG. 4). The housing 108 may also have a first enclosure wall 128 (FIG. 3), a second enclosure wall 130 (FIG. 3), a third enclosure wall 132 (FIG. 3), and a fourth enclosure wall 134 (FIG. 3), which are adjacent the bottom 124 (FIG. 4) of the housing 108. A housing hole 136 (FIG. 3), which defines a housing hole longitudinal axis 138 (FIG. 3), is formed in the ledge 122 (FIG. 3) of the housing 108. In an alternative embodiment a groove (not shown) may be formed in the ledge 122 (FIG. 3) adjacent the lateral surface 120 (FIG. 3) of the housing 108. The housing 108 may be made of a transparent material, for example plastic, to permit viewing inside the housing 108. However, the housing 108 could be made of other material, for example, metal, which could be sheet metal.

Referring to FIG. 3, the leak detector 100 may also include an insertion member 140 that has a top 142, a bottom 144, a first side face 146, and a second side face 148, and that may also have an insertion member hole 150. The top 142 of the insertion member 140 may be attached to the ledge 122 of the housing 108. The insertion member 140 may be implemented with various lengths from the top 142 of the insertion member 140 to the bottom 144 of the insertion member 140, and with various widths from the first side face 146 to the second side face 148. As an example, the insertion member 140 may have a length of about 5.5 cm, and a width of about 3.8 cm. However, larger or smaller lengths and/or widths could be used.

Figure 5:
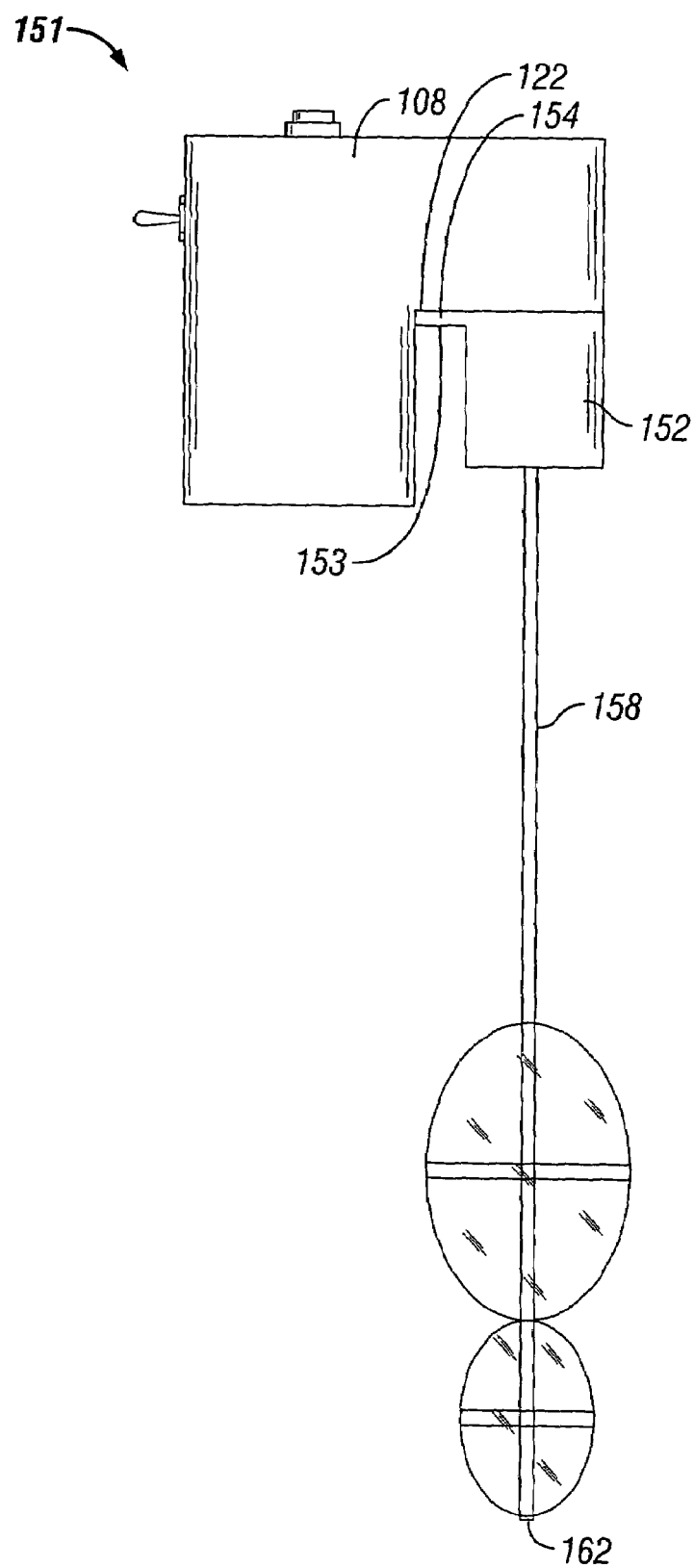
FIG. 5 is a side view of a leak detector in accordance with an exemplary embodiment of the invention.

In an alternative embodiment of a leak detector 151 shown in FIG. 5, the insertion member 152 could include a surface 153 on a protruding portion 154 of the insertion member 140 that is parallel to the ledge 122 of the housing 108, which could be placed on the top of a pipe when the leak detector 100 is in use, instead of placing the ledge 122 of the housing 108 on the pipe. In another alternative embodiment, the insertion member 140 could be formed as part of the housing 108.

Referring to FIG. 3, the insertion member hole 150 defines an insertion member hole longitudinal axis 156. The insertion member hole 150 is at least partially aligned with the housing hole 136 in the ledge 122 of the housing 108. As an example, the housing hole 136 and the insertion member hole 150 may be substantially round and have substantially the same diameter and may be substantially concentric, with the longitudinal axis 138 of the housing hole 136 and the longitudinal axis 156 of the insertion member hole 150 being substantially collinear. In one example, the diameter of the housing hole 136 and the diameter of the insertion member hole 150 may each be about 0.7 cm.

The first side face 146 of the insertion member 140 may be substantially parallel to the lateral surface 120 of the housing 108. The first side face 146 of the insertion member 140 and the lateral surface 120 of the housing 108 may be substantially perpendicular to the ledge 122 of the housing 108. In one example, the lateral surface 120 and the first side face 146 may be about 1 cm apart. However, the lateral surface 120 and the first side face 146 could be more than 1 cm apart, or less than 1 cm apart. For example, a distance greater than 1 cm may be beneficial if the leak detector 100 is placed on a pipe that has a side thickness greater than about 0.8 cm, or if the leak detector 100 is placed on a double containment pipe.

The depth of the first side face 146 of the insertion member 140 may be less than about 3 centimeters, so that a pipe having a diameter of about 10 centimeters may easily curve around the first side face of the insertion member 140. However, the first side face 146 could have a larger or smaller depth, and the leak detector 100 may be used with pipes having larger or smaller diameters.

Referring to FIG. 3, the leak detector 100 also includes a dowel 158 that has a first end 160 and a second end 162, and that defines a dowel longitudinal axis 164. As an example, the dowel 158 may have a substantially circular cross section with a diameter of about 0.65 centimeters, and may have a length of about 31 centimeters. Alternatively, in other examples the dowel 158 could have an oblong, square, rectangular, or other type of cross section. The dowel 158 is inserted into the housing hole 136 in the ledge 122 of the housing 108, with the longitudinal axis 164 of the dowel 158 substantially collinear with the longitudinal axis 138 of the housing hole 136. In embodiments where the insertion member 140 has an insertion member hole 150, the dowel 158 is inserted through both the insertion member hole 150 and the housing hole 136, with the longitudinal axis 164 of the dowel 158 substantially collinear with the longitudinal axis 156 of the insertion member hole 150 and the longitudinal axis 138 of the housing hole 136. The longitudinal axis 164 of the dowel 158 may be substantially perpendicular to the ledge 122 of the housing 108.

Referring to FIG. 4, a retaining pin 166 may be attached to the dowel 158 near the first end 160 (FIG. 3) of the dowel 158 inside the housing 108, to prevent the dowel 158 from falling out of the housing 108. Alternatively, a retaining ring (not shown) may be attached to the dowel 158 near the first end 160 of the dowel 158 inside the housing 108, to prevent the dowel 158 from falling out of the housing 108.

At least one float is attached to the dowel 158. As an example, the at least one float may include a plurality of substantially airtight containers attached to the dowel. Referring to FIG. 2, in one example, the at least one float comprises a first oblong spheroid 168 that defines a first spheroid central axis 170, and a second oblong spheroid 172 that defines a second spheroid central axis 174, wherein the dowel 158 is inserted through the first oblong spheroid 168 and the second oblong spheroid 172 with the longitudinal axis 164 of the dowel 158 substantially collinear with the first spheroid central axis 170 and the second spheroid central axis 174. The first oblong spheroid 168 may include a first cap 176 that has a hole 178 and a rim 180, and a second cap 182 that has a hole 184 and a rim 186, wherein the rim 180 of the first cap 176 is attached to the rim 186 of the second cap 182 to form the first oblong spheroid 168, and wherein the dowel 158 is inserted through the hole 178 in the first cap 176 and the hole 184 in the second cap 182. Similarly, the second oblong spheroid 172 may include a third cap 188 that has a hole 190 and a rim 192, and a fourth cap 194 that has a hole 196 and a rim 198, wherein the rim 192 of the third cap 188 is attached to the rim 198 of the fourth cap 194 to form the second oblong spheroid 172, and wherein the dowel 158 is inserted through the hole 190 in the third cap 188 and the hole 196 in the fourth cap 194. Alternatively, the float(s) need not have holes, and the dowel need not be inserted through holes in the float(s).

The first oblong spheroid 168 and the second oblong spheroid 172 may be the same size or may be different sized. In one example the first oblong spheroid 168 is larger than the second oblong spheroid 172. As a further example, the second oblong spheroid 172 may be located proximate the second end 162 of the dowel 158, and the first oblong spheroid 168 may be located proximate the second oblong spheroid 172. The first oblong spheroid 168 and the second oblong spheroid 172 may be substantially airtight when the dowel 158 is inserted through the first oblong spheroid 168 and the second oblong spheroid 172.

In another example, the at least one float includes a first substantially airtight sphere (not shown), and a second substantially airtight sphere (not shown), wherein the diameter of the first sphere is larger than the diameter of the second sphere. In another example, a single oblong float (shaped somewhat like a large hotdog, not shown) could be used, with the float attached to the dowel 158 with a longitudinal axis defined by the float collinear with the longitudinal axis 164 of the dowel 158. In some embodiments, to reduce the probability of a float contacting the side of a pipe that the float may be placed into, the width of the insertion member 140 is at least as large as the width of each float.

Referring to FIG. 4, the leak detector 100 also includes a detector switch 200 that is attached to the housing 108. As an example, the detector switch 200 may be a model number 275-016 SPDT Switch, available from Radio Shack, which is specified to have an operating force of 5 grams, and is rated at 5 amps at 250VAC. In one example, the detector switch 200 may be attached to a mounting block that is attached to the housing 108. The detector switch 200 has an actuator arm 202, which can be moved to open and close electrical contacts in the detector switch 200. As an example, the detector switch 200 may be a normally closed switch, wherein the electrical contacts in the detector switch are in electrical contact when the actuator arm 202 is not pushed to a position near the body 204 of the detector switch 200, and wherein the electrical contacts are open (not in electrical contact) when the actuator arm 202 is pushed to a position near the body 204 of the detector switch 200.

The actuator arm 202 is located proximate the first end 160 of the dowel 158, so that when the first end 160 of the dowel 158 is pushed towards the top 110 of the housing 108, the first end 160 of the dowel 158 pushes against the actuator arm 202 to cause the electrical contacts to open. The floats, which may be the first oblong spheroid 168 and the second oblong spheroid 172, may be placed in a liquid to cause the dowel 158 to be lifted by the buoyancy of the floats, thereby causing the first end 160 of the dowel 158 to push the actuator arm 202 to a position near the body 204 of the detector switch 200 (as shown in FIG. 4) to cause the electrical contacts to open. As an example, the first end 160 of the dowel 158 may have a range of motion of about 0.5 cm from an upper position where the first end 160 of the dowel 158 pushes the actuator arm 202 to a position near the body 204 of the detector switch 200, to a lower position where the retaining pin 166 attached to the dowel 158 contacts the housing 108. The detector switch 200 is electrically closed when the first end 160 of the dowel 158 does not push the actuator arm 202 of the detector switch 200 to a position near the body 204 of the detector switch 200.

The leak detector 100 may also include an audio transducer 206, shown in FIG. 4, that may be attached to the housing 108. As an example, the audio transducer 206 may be a piezo electric transducer, a bell, a horn, a speaker, or any other suitable type of sound generating device. In one example, the audio transducer 206 may be a model number 273-079 102 dB Siren Sound Piezo Buzzer, available from Radio Shack, which is specified to operate on 6 to 14 volts DC, and to have 150 mA current at 12V, and a frequency response of 2,000–4,500 Hz. The audio transducer 206 may be attached to the bottom 124 of the housing 108 on the exterior of the housing 108, wherein the audio transducer 206 is partially enclosed and protected by the first enclosure wall 128, the second enclosure wall 130, the third enclosure wall 132 and the fourth enclosure wall 134 (shown in FIG. 3).

Figure 6:
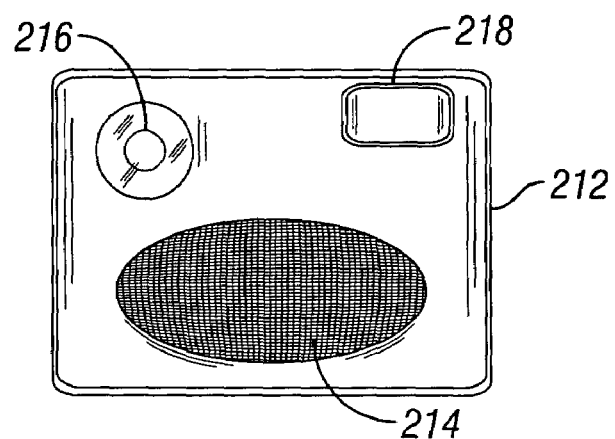
FIG. 6 is a view of an electromagnetic receiver in accordance with an exemplary embodiment of the invention.
Figure 7:
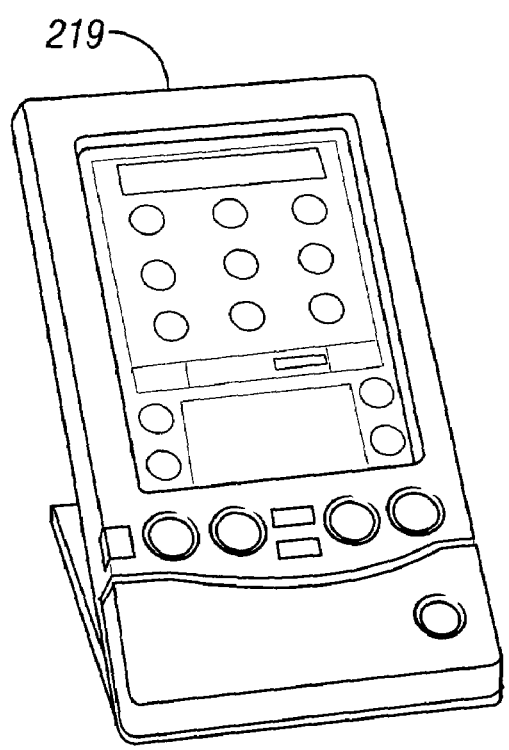
FIG. 7 is a perspective view of a personal digital assistant.

Alternatively, the leak detector 100 may include an indicator light 208 shown in FIG. 4, in addition to, or instead of, the audio transducer 206. The indicator light 208 may be attached to the housing 108. The indicator light 208 may be, for example, an incandescent light bulb, a fluorescent light bulb, or a LED. However, the leak detector need not include an indicator light. For example, the leak detector shown in FIG. 5 does not include an indicator light. Similarly, the leak detector need not include an audio transducer. For example, the leak detector shown in FIG. 12 does not include an audio transducer. In other alternative embodiments, an electromagnetic transmitter 210, shown in FIG. 4, which for example, could be a radio transmitter, could be attached to the housing 108 of the leak detector 100, for transmitting a radio signal to a receiver 212, shown in FIG. 6. However, the leak detector need not include an electromagnetic transmitter. For example, the leak detector shown in FIG. 12 does not include an electromagnetic transmitter. The electromagnetic transmitter 210 and receiver 212 could be included in addition to, or instead of, including an audio transducer 206 and/or indicator light 208. The receiver 212 (FIG. 6) could include a receiver audio transducer 214, a receiver indicator light 216, a vibrator 218, and/or other type of indicator for indicating the existence of a leak. The receiver 212 could be carried by a person, or placed in another location that is separate from the housing 108 of the leak detector 100, for remotely indicating the existence of a leak. In another example the receiver could be a personal digital assistant (PDA) 219, shown in FIG. 7. In another example, the receiver could be part of a computer, which could be, for example, a personal computer. In another alternative embodiment, the leak detector could be coupled to a computer with wires or fiber optic cable, instead of, or in addition to including the audio transducer 206, and/or the indicator light 208 and/or the electromagnetic transmitter 210. In another alternative embodiment, an audio transducer or indicator light could be located remotely from the leak detector, and could be coupled to the leak detector with wires or fiber optic cable. As will be described in more detail below, the audio transducer 206, indicator light 208, electromagnetic transmitter 210 and receiver 212, and/or computer may be used to indicate that the leak detector 100 has detected the lowering of the top surface of a liquid, or a decrease in the quantity of a liquid, or the absence of a liquid.

Referring to FIG. 4, the leak detector 100 may also include a battery socket 220 electrically coupled to the detector switch 200. As an example, the battery socket 220 may be a socket for a 9 volt battery. However, other sockets and voltages could be used. The leak detector 100 may also include an on/off switch 222 electrically coupled to the detector switch 200 and the audio transducer 206. As an example, the on/off switch 222 may be attached to the front 116 (FIG. 2) of the housing 108 through a hole in the front 116 of the housing 108. In one example, the on/off switch 222 is a SPST switch in a model number 275-322 toggle switch kit, rated at 3 amps at 125VAC, available from Radio Shack. As an example, the detector switch 200, the audio transducer 206, the on/off switch 222, and the battery socket 220 may be electrically coupled in series. The leak detector 100 may also include a test switch 224, shown in FIGS. 2 and 4. As an example, the test switch 224 may be attached to the top 110 of the housing 108, through a hole in the top 110 of the housing 108. As an example, the test switch 224 may be a model number 275-1547 Mini SPST Momentary Switch, which is normally open and is rated at 0.5 amp at 125 VAC, available from Radio Shack. The test switch 224 may be electrically coupled in parallel with the detector switch 200. If the leak detector 100 includes an indicator light 208 and an audio transducer 206, the indicator light 208 may be electrically coupled in parallel with the audio transducer 206, or in series with the audio transducer 206. As an example, wires may be used to electrically couple the electrical components of the leak detector 100. Alternatively, the electrical components could be electrically coupled on a circuit board.

Figure 10:
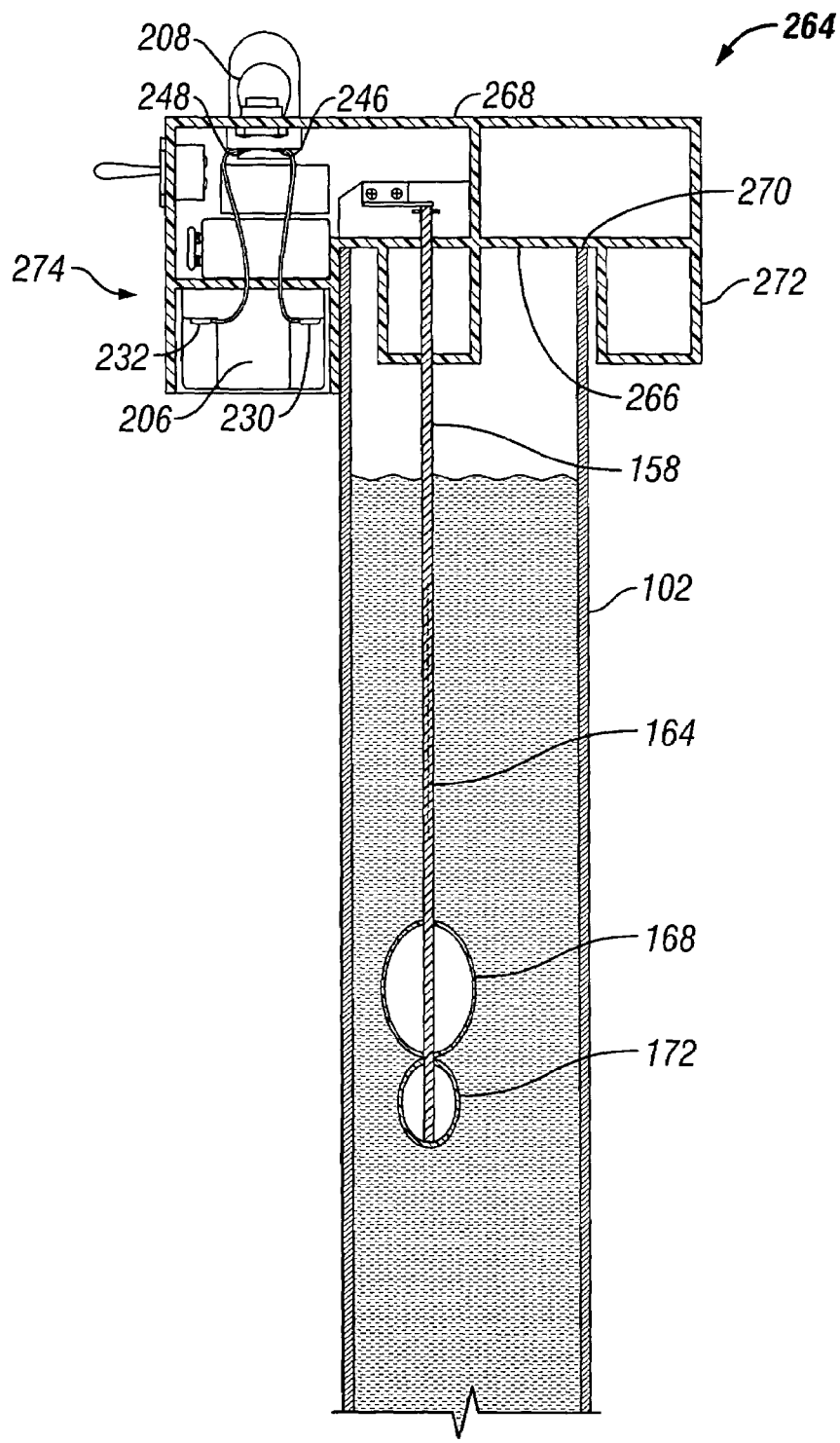
FIG. 10 is a sectional view of a leak detector in an operative environment in accordance with an exemplary embodiment of the invention.

Referring to FIG. 4, as an example, the detector switch 200 may have a first electrical connector 226 and a second electrical connector 228, the audio transducer 206 may have a first electrical connector 230 and a second electrical connector 232, the on/off switch 222 may have a first electrical connector 234 and a second electrical connector 236, and the battery socket 220 may have a first electrical connector 238 and a second electrical connector 240. As an example, the second electrical connector 228 of the detector switch 200 may be coupled to the first electrical connector 230 of the audio transducer 206, and the second electrical connector 232 of the audio transducer 206 may be coupled to the first electrical connector 238 of the battery socket 220, and the second electrical connector 240 of the battery socket 220 may be coupled to the first electrical connector 234 of the on/off switch 222, and the second electrical connector 236 of the on/off switch 222 may be coupled to the first electrical connector 226 of the detector switch 200. Additionally, the test switch 224 may have a first electrical connector 242 and a second electrical connector 244, and as an example, the first electrical connector 242 of the test switch 224 may be coupled to the first electrical connector 226 of the detector switch 200, and the second electrical connector 244 of the test switch 224 may be coupled to the second electrical connector 228 of the detector switch 200. As shown in FIG. 10 for clarity, the indicator light 208 may have a first electrical connector 246 and a second electrical connector 248, and as an example, the first electrical connector 246 of the indicator light 208 may be coupled to the first electrical connector 230 of the audio transducer 206, and the second electrical connector 248 of the indicator light 208 may be coupled to the second electrical connector 232 of the audio transducer 206.

C. Additional Embodiments

Figure 8:
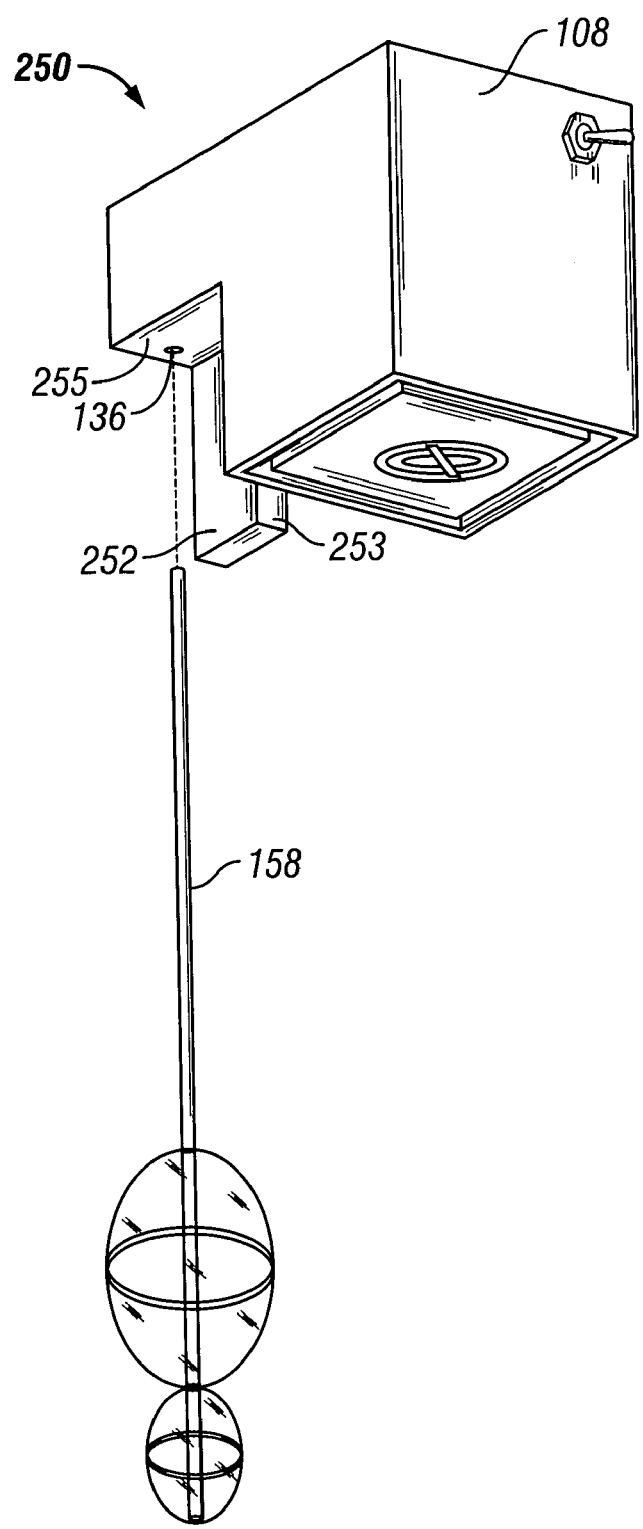
FIG. 8 is an exploded perspective view of a leak detector in accordance with an exemplary embodiment of the invention.

An example of an alternative embodiment of a leak detector 250 is shown in FIG. 8. In this example, there is no insertion member hole in the insertion member 252, and the insertion member 252 (which has a first side face 253) may be attached to any suitable location on the housing 108. As an example, the insertion member 252 may be attached to the ledge 255 of the housing 108 near the housing hole 136 in the ledge 255 of the housing 108. The dowel 158 is inserted through the housing hole 136 in the ledge 255 of the housing 108. In this alternative embodiment, to provide additional support for the dowel 158 along the housing hole 136, the thickness of the ledge 255 (which is the distance from the interior of the housing 108 to the exterior of the housing measured parallel to the longitudinal axis of the housing hole), may be greater than the thickness of the ledge 255 in the embodiment of the leak detector 100 shown in FIG. 3.

Figure 9:
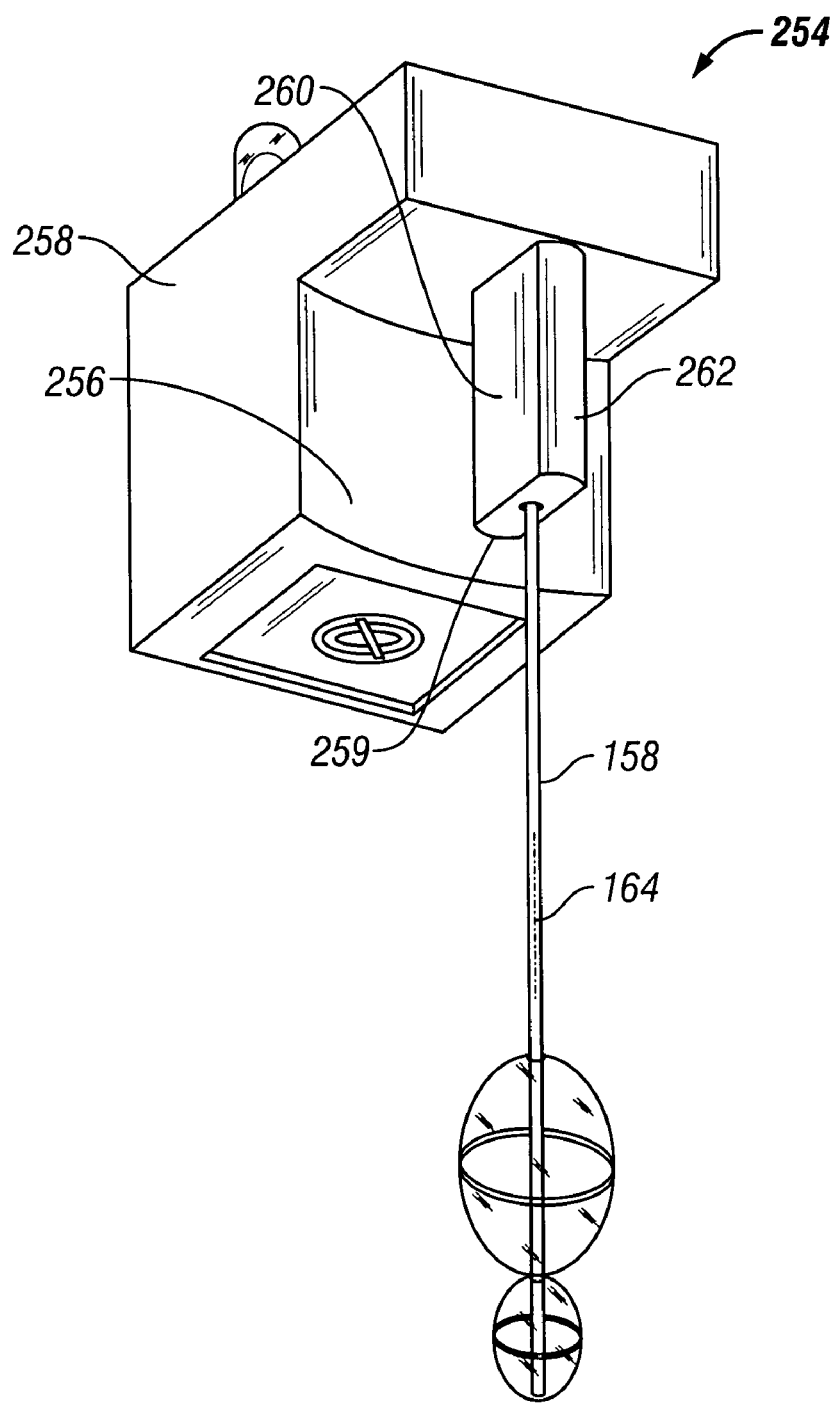
FIG. 9 is a perspective view of a leak detector in accordance with an exemplary embodiment of the invention.

An example of another alternative embodiment of a leak detector 254 is shown in FIG. 9. In this example, the lateral surface 256 of the housing 258 may be curved around a curvature axis that is substantially parallel to the longitudinal axis 164 of the dowel 158, wherein the curvature axis may be substantially collinear with the longitudinal axis 164 of the dowel 158. Further, the first side face 259 of the insertion member 260 may be curved around an axis that is substantially parallel to the longitudinal axis 164 of the dowel 158. Additionally, the insertion member 260 may also have a second side face 262 that is also curved around an axis that is substantially parallel to the longitudinal axis 164 of the dowel 158. The first side face 259 and/or the second side face 262 may be curved even if the lateral surface 256 of the housing 258 is not curved, and the lateral surface 256 of the housing 258 may be curved even if the first side face 259 and/or the second side face 262 are not curved.

An example of another alternative embodiment of a leak detector 264 is shown in FIG. 10. In the leak detector 264, the ledge 266 of the housing 268 is enlarged to cover a larger area of the top end 270 of the pipe 102, for example to help keep debris out of the pipe 102. Also, in the leak detector 264, a stabilizer member 272 is attached to the ledge 266 on an opposite side of the ledge 266 from the lower portion 274 of the housing 268. The stabilizer member 272 may be located on the outside of the pipe 102 on the opposite side of the pipe 102 from the lower portion 274 of the housing 268, to facilitate keeping the dowel 158 away from the inside surface of the pipe 102, and to provide a counterweight to the lower portion 274 of the housing 268 to facilitate keeping the ledge 266 of the housing 268 perpendicular to the top end 270 of the pipe 102 so that the longitudinal axis 164 of the dowel 158 will be substantially parallel to the longitudinal axis of the pipe 102. Keeping the dowel 158 away from the inside surface of the pipe 102 and near the center of the pipe 102, and keeping the longitudinal axis 164 of the dowel 158 substantially parallel to the longitudinal axis of the pipe 102, helps prevent the floats, such as the first oblong spheroid 168 and the second oblong spheroid 172 from contacting the inside surface of the pipe 102, which could limit the vertical movement of the floats.

Figure 11:
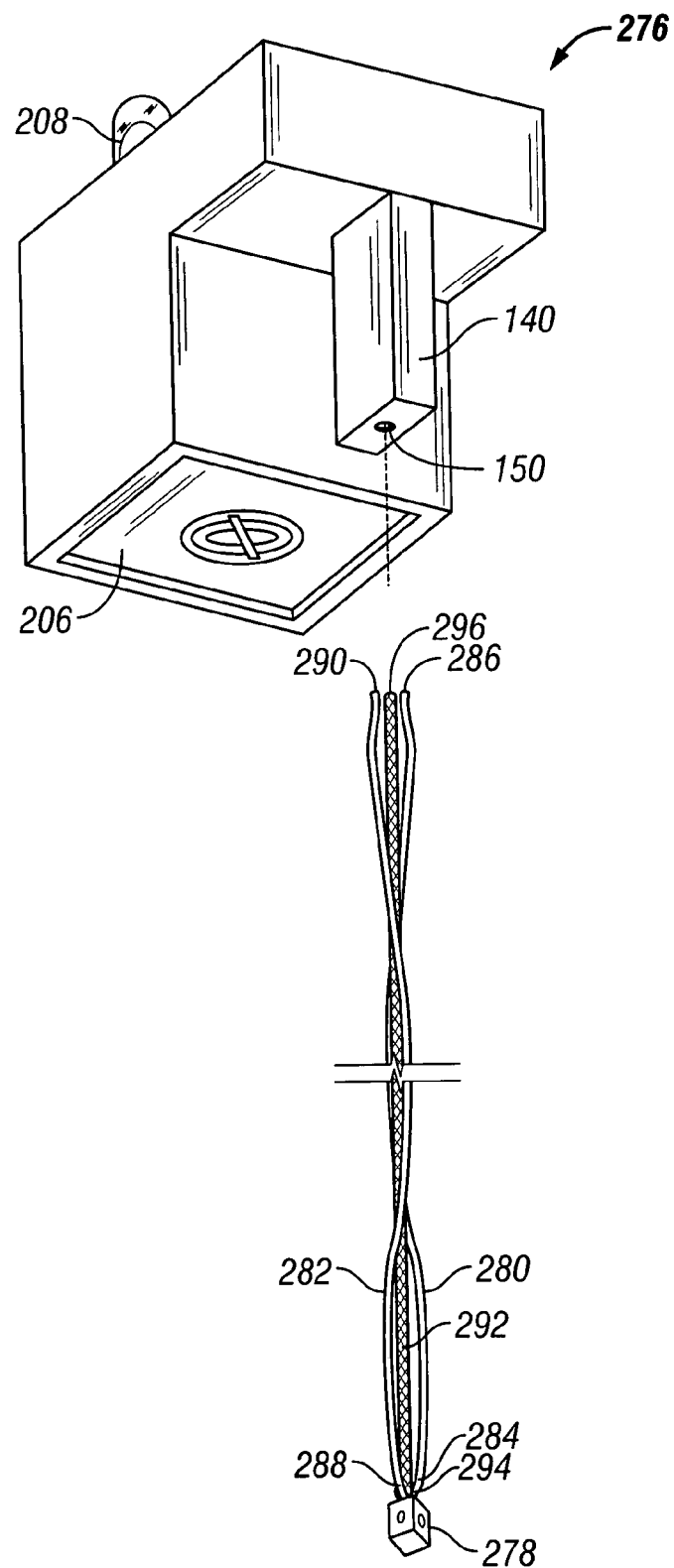
FIG. 11 is an exploded perspective view of a leak detector in accordance with an exemplary embodiment of the invention.

An example of another alternative embodiment of a leak detector 276 is shown in FIG. 11. The leak detector 276 includes an electronic moisture detector 278, and a first wire 280 and a second wire 282 that are inserted through the housing hole 136 (FIG. 3). The first wire 280 has a first end 284 that is coupled to the electronic moisture detector 278, and a second end 286 that is electrically coupled to the audio transducer 206. Similarly, the second wire 282 has a first end 288 that is coupled to the electronic moisture detector 278, and a second end 290 that is electrically coupled to the audio transducer 206. Herein, "coupled" means directly or indirectly coupled. For example, the first wire 280 and second wire 282 may be coupled to the audio transducer 206 by connecting the second end 286 of the first wire 280 and the second end 290 of the second wire 282 to the circuitry shown in FIG. 4, in place of the first electrical connector 226 and the second electrical connector 228 of the detector switch 200. The second end 286 of the first wire 280 and the second end 290 of the second wire 282 may be coupled to an indicator light 208 and/or an electromagnetic transmitter 210 (FIG. 4), instead of, or in addition to, the audio transducer 206. As shown in FIG. 11, although not required, the insertion member 140 may have an insertion member hole 150 that is at least partially aligned with the housing hole 136 (FIG. 3), and the first wire 280 and the second wire 282 may be inserted through the insertion member hole 150, in addition to the housing hole 136. A cable 292 may also be included, which also may be inserted through the housing hole 136, and through the insertion member hole 150. A first end 294 of the cable 292 is attached to the moisture detector 278, and a second end 296 of the cable is attached to the housing 108. The leak detector 276 may be placed on the top edge of a pipe, and the electronic moisture detector 278 may be placed in the pipe to detect the presence of a liquid. In this alternative embodiment, the leak detector need not include a dowel 158, floats (such as the first oblong spheroid 168 or the second oblong spheroid 172), a detector switch 200, or a retaining pin 166.

Figure 12:
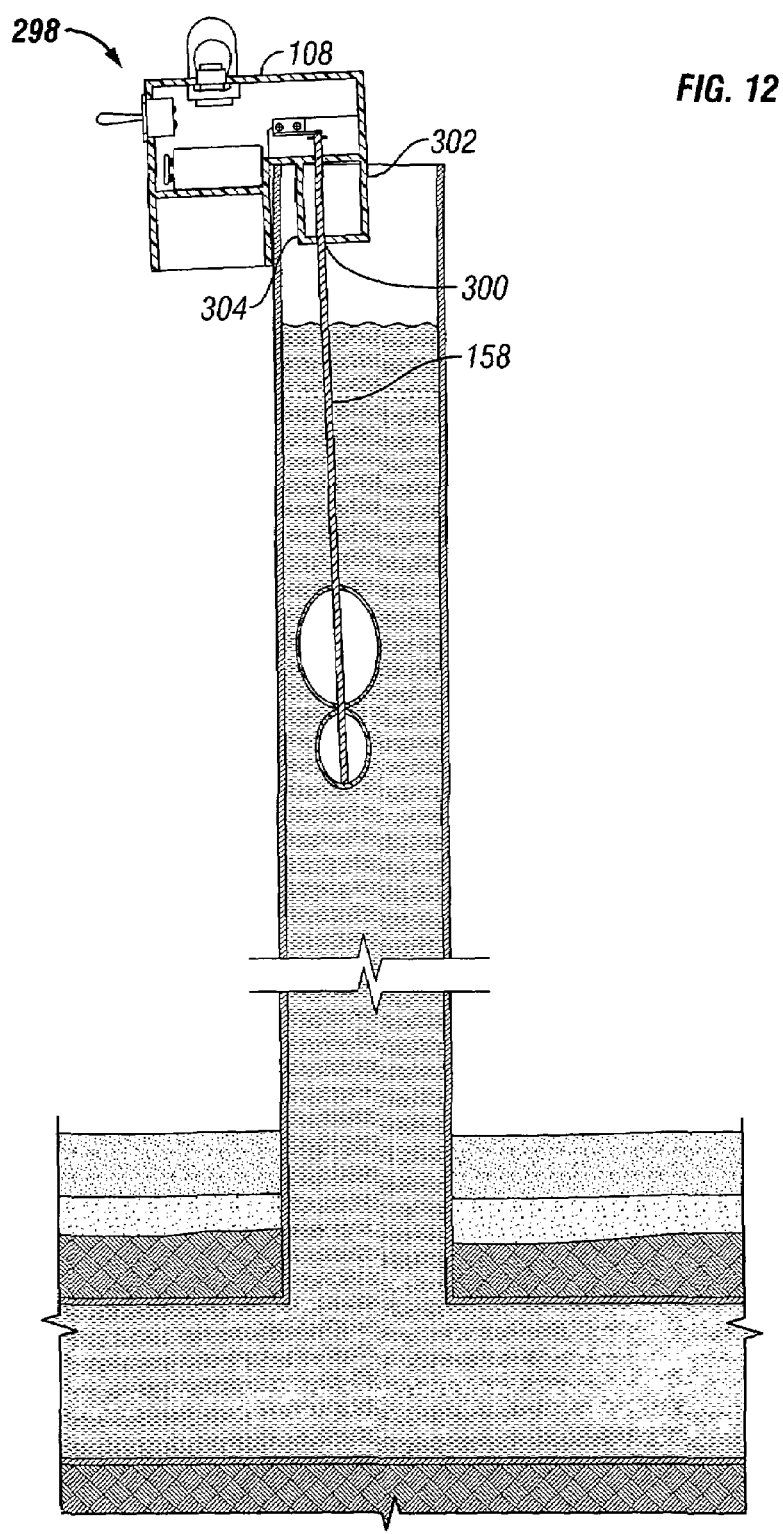
FIG. 12 is a sectional view of a leak detector in an operative environment in accordance with an exemplary embodiment of the invention.

Another alternative embodiment of a leak detector 298 is shown in FIG. 12. In the leak detector 298, the insertion member hole 300 in the insertion member 302 is closer to the first side face 304 of the insertion member 302, than the distance from the insertion member hole 150 to the first side face 146, in the insertion member 140 shown in FIGS. 3 and 4. Also, the leak detector 298 does not have an electromagnetic transmitter or an audio transducer.

D. Additional Examples of a Leak Detector in Operative Environments

Figure 13:
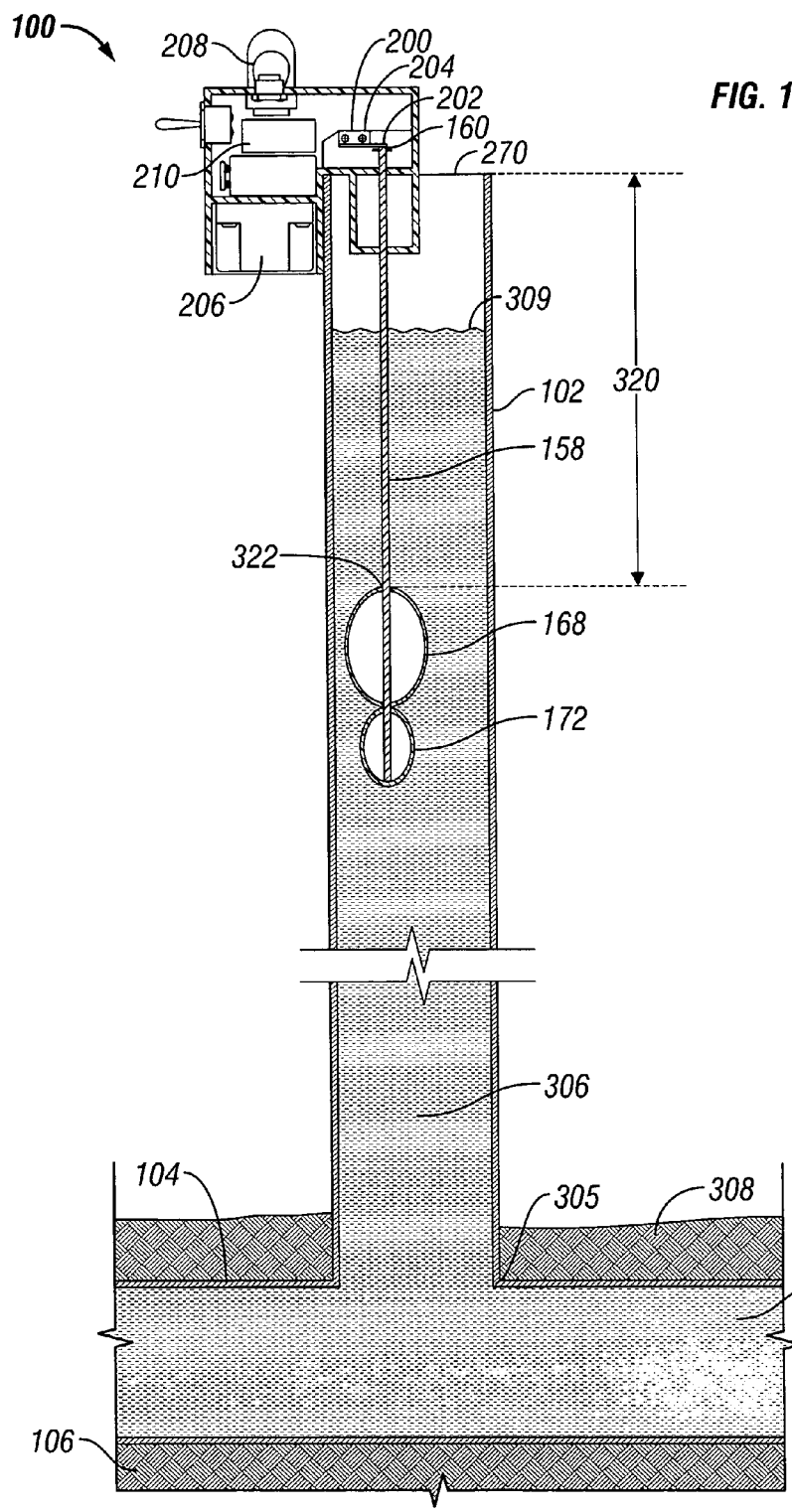
FIG. 13 is a sectional view of a leak detector in an operative environment in accordance with an exemplary embodiment of the invention.

FIG. 13 shows the leak detector 100 in an example of its operative environment, with the leak detector 100 placed on the top end 270 of the pipe 102, which is attached to the pipe network 104. The pipe 102 also has a bottom end 305, and a bore 306, and the pipe network 104 has a bore 307. The pipe network 104 is located in a trench 106, and the pipe network 104 is at least partially covered with dirt 308. As shown in FIG. 13, there are no leaks in the pipe network 104, and the top surface 309 of the liquid (for example, water) in the pipe 102 is above the top of the floats (the first oblong spheroid 168 and the second oblong spheroid 172). The floats are floating in the water, and consequently the first end 160 of the dowel 158 is pushing the actuator arm 202 of the detector switch 200 to a position near the body 204 of the detector switch 200, and the audio transducer 206 is not sounding an alarm indicating a leak, and the indicator light 208 is not lit to indicate a leak, and the electromagnetic transmitter 210 is not transmitting a signal indicating a leak.

Figure 14:
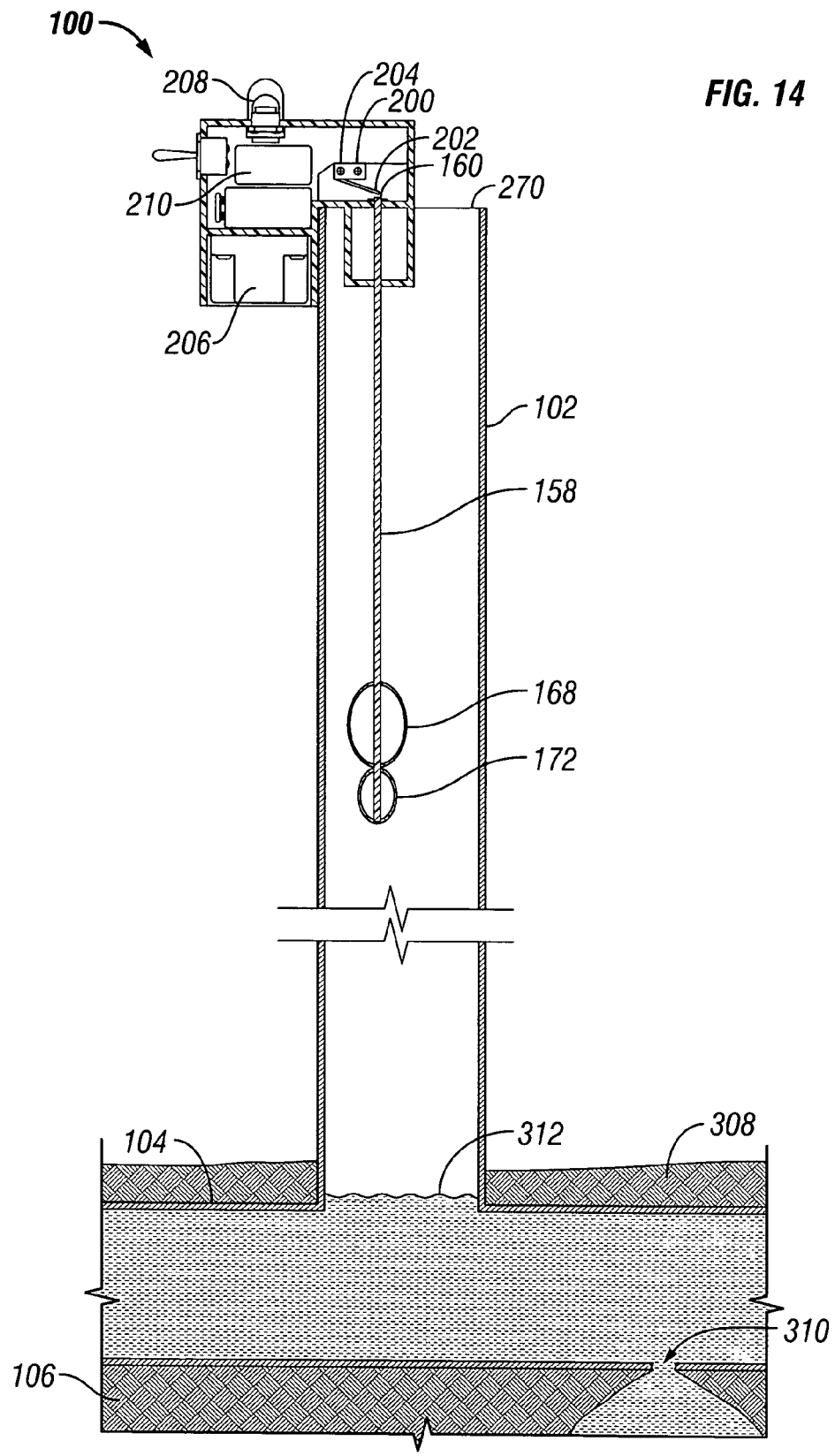
FIG. 14 is a sectional view of a leak detector in an operative environment in accordance with an exemplary embodiment of the invention.

FIG. 14 shows the leak detector 100 in another example of its operative environment, with the leak detector 100 placed on the top end 270 of the pipe 102, which is attached to the pipe network 104. The pipe network 104 is located in the trench 106, and as in FIG. 13, the pipe network 104 is at least partially covered with dirt 308. However, in FIG. 14, there is broken area 310 creating a leak in the pipe network 104, and the top surface 312 of the water in the vertical pipe 102 is below the bottom of the floats (the first oblong spheroid 168 and the second oblong spheroid 172). The floats are not floating in the water, and consequently the first end 160 of the dowel 158 is not pushing the actuator arm 202 of the detector switch 200 to a position near the body 204 of the detector switch 200, and the audio transducer 206 is sounding an alarm, the indicator light 208 is lit, and the electromagnetic transmitter 210 is transmitting a signal, to indicate the presence of the leak. The presence of the leak may be indicated while the floats are still floating in the water, when the water level lowers to an extent sufficient to cause the first end 160 of the dowel 158 to cease pushing the actuator arm 202 of the detector switch 200 to a position near the body 204 of the detector switch 200.

Figure 15:
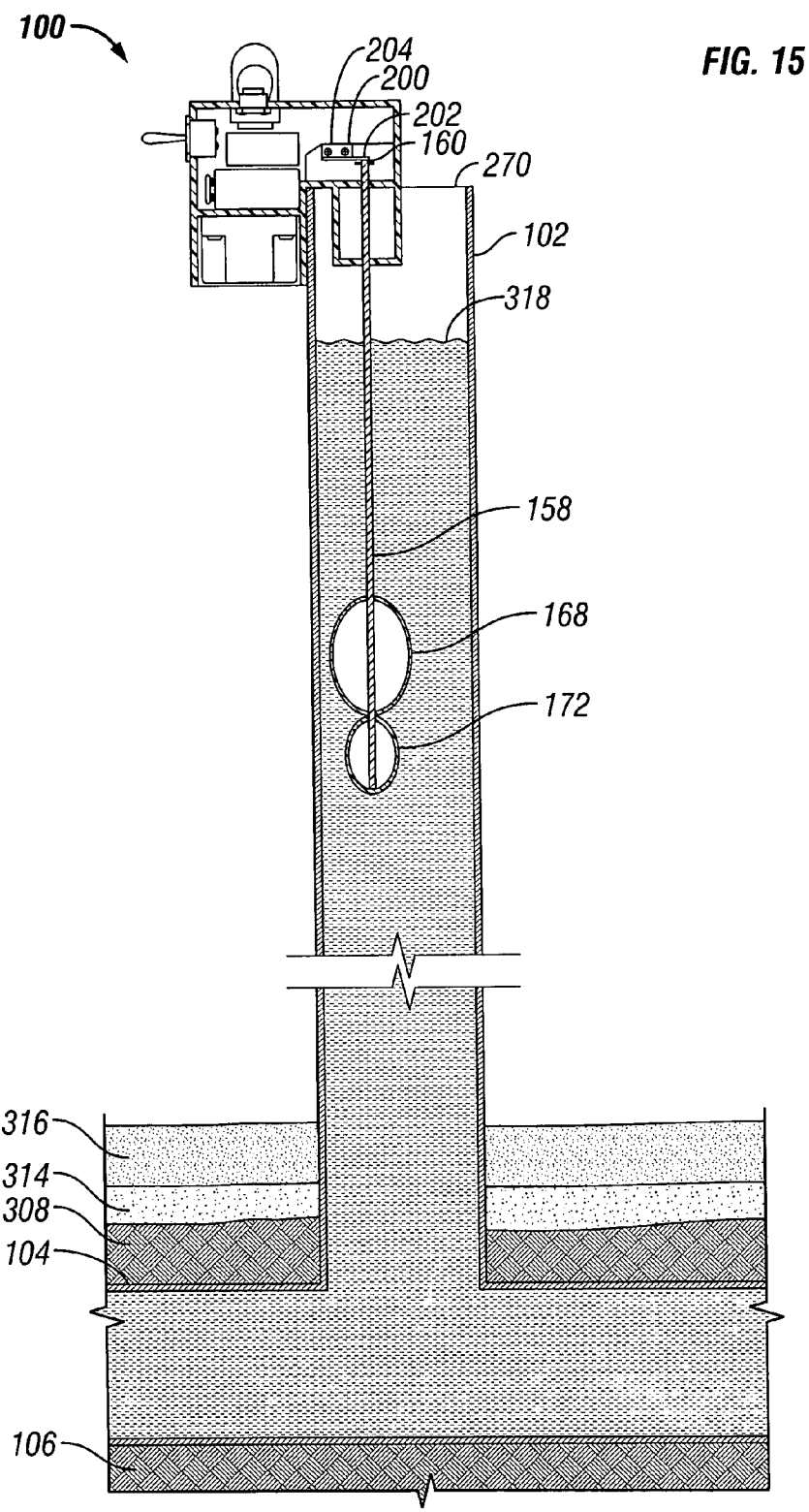
FIG. 15 is a sectional view of a leak detector in an operative environment in accordance with an exemplary embodiment of the invention.

FIG. 15 shows the leak detector 100 in another example of its operative environment, with the leak detector 100 placed on the top end 270 of the pipe 102, which is attached to the pipe network 104. The pipe network 104 is located in the trench 106, and the pipe network 104 is at least partially covered with dirt 308, and sand and gravel 314 has been placed on the dirt 308, and a concrete slab 316 has been poured on the sand and gravel 314. As shown in FIG. 15, there are no leaks in the pipe network 104, and the top surface 318 of the water in the pipe 102 is above the top of the floats (the first oblong spheroid 168 and the second oblong spheroid 172). The floats are floating in the water, and consequently the first end 160 of the dowel 158 is pushing the actuator arm 202 of the detector switch 200 to a position near (or against) the body 204 of the detector switch 200, and the audio transducer 206 is not sounding an alarm indicating a leak, and the indicator light 208 is not lit to indicate a leak, and the electromagnetic transmitter 210 is not transmitting a signal indicating a leak.

II. Operation

In addition to the various hardware embodiments described above, a different aspect of the invention concerns a method for detecting a leak. The method aspects of the invention may alternatively be referred to as a method for detecting a plumbing leak, a method for detecting a leak in a plumbing system, a method for detecting a leak in waste lines, a method for detecting the lowering of the level of a liquid, a method for detecting the lowering of the top surface of a liquid, or as a method for detecting a decrease of the quantity of a liquid.

A. Overall Sequence of Operation

Figure 16A:
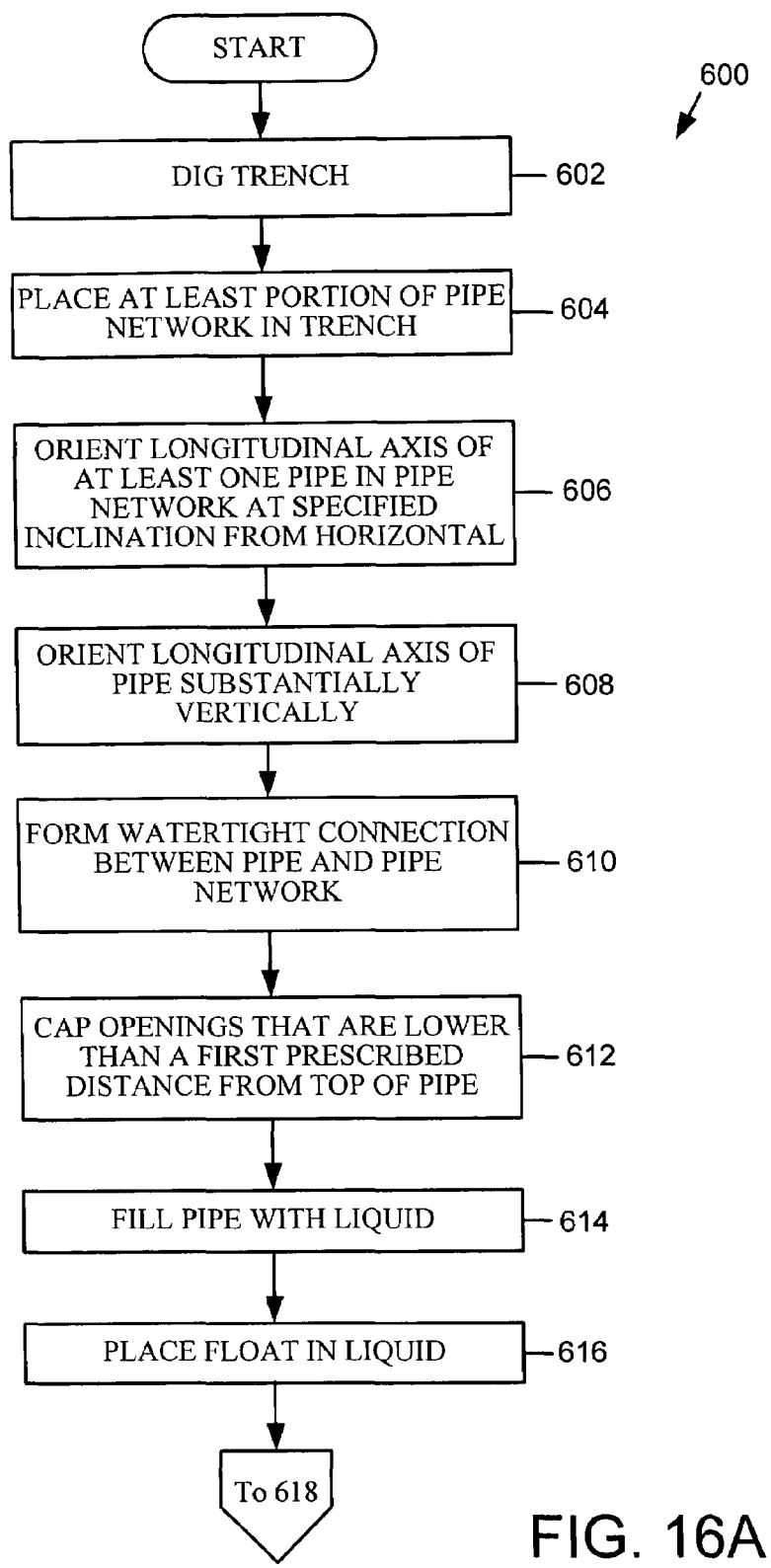
FIGS. 16A–B are a flowchart of an operational sequence for detecting a leak in accordance with an exemplary embodiment of the invention.
Figure 16B:
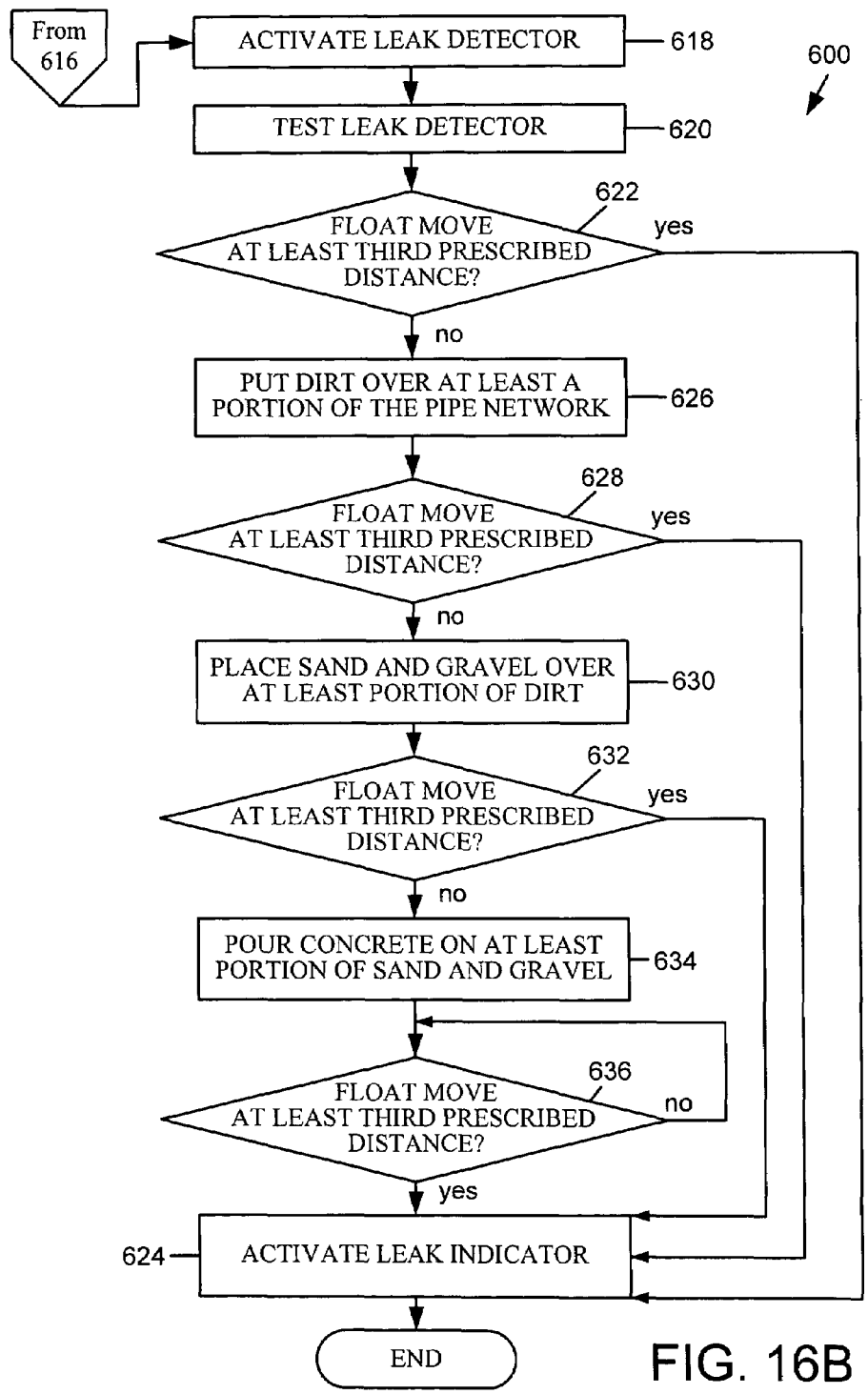

An example of the method aspect of the present invention is illustrated in FIGS. 16A–B, which show a sequence 600 for a method for detecting a leak. For ease of explanation, but without any intended limitation, the example of FIGS. 16A–B is described in the context of the leak detector 100 described above.

The sequence 600, may begin with operation 602, which may be included in the sequence 600. Operation 602 comprises digging a trench 106. The sequence 600 may also include operation 604 which comprises placing at least a portion of a pipe network, for example at least a portion of the pipe network 104, in the trench 106. If included, operations 602 and 604 are performed prior to the operation 614 of filling the pipe 102 with a liquid (discussed below). The sequence 600 may also include operation 606, which comprises orienting the longitudinal axis of at least one of the plurality of pipes in the pipe network 104 at a specified inclination from horizontal, for example an inclination from horizontal of about ¼ inch per foot.

The sequence 600 also includes operation 608, which comprises orienting a longitudinal axis of a pipe, for example pipe 102, substantially vertically. As shown in FIG. 13, the pipe 102 has a top end 270, a bottom end 305, and a bore 306. The pipe 102 may have any length and diameter, and in one example has a length of approximately 1.3 meters, and an inner bore diameter of approximately 10 centimeters. The sequence may also include operation 610, in which a watertight connection is formed between the pipe 102 and a pipe network, for example the pipe network 104, wherein the bore 307 of the pipe network 104 adjacent the pipe 102 is in fluid communication with the bore 306 of the pipe 102. As an example, the pipe network may comprise a plurality of pipes (that each have a longitudinal axis).

Operation 612 comprises capping all openings that are in fluid communication with the bore 306 of the pipe 102 and that are lower than a first prescribed distance from the top end of the pipe. As an example, the first prescribed distance may be about the distance 320 (shown in FIG. 13) from the top 270 of the pipe 102 to a top of the float (for example the top 322 of the first oblong spheroid 168 shown in FIG. 13), when the float is placed in the liquid.

In operation 614 the pipe 102 is filled with a liquid (for example, water) until a top surface 309 (FIG. 13) of the liquid is no lower than a second prescribed distance from the top end 270 of the pipe 102. As an example, the second prescribed distance may be about the same as the first prescribed distance. The top surface 309 of the liquid should not be closer to the top 270 of the pipe 102 than any uncapped openings that are in fluid communication with the bore 306 of the pipe 102, and may be further from the top 270 of the pipe 102 than the first prescribed distance. However, the second prescribed distance must be close enough to the top 270 of the pipe 102 so that when the float (for example the first oblong spheroid 168 and the second oblong spheroid 172) is placed in the liquid (which is discussed in operation 616 below), the float will lift the dowel 158 and cause the first end 160 of the dowel 158 to push the actuator arm 202 of the detector switch 200 to a position near the body 204 of the detector switch 202. In operation 616, the float (for example the first oblong spheroid 168 and the second oblong spheroid 172) is placed in the liquid. For example, the float may be placed in the liquid through an opening in the top end 270 of the pipe 102. The float may be placed in the liquid by placing the housing 108 of the leak detector 100 on the top end 270 of the pipe 102, with the insertion member 140, the dowel 158, and the float (for example the first oblong spheroid 168 and the second oblong spheroid 172) positioned inside the pipe 102 so that the float is placed in the water. As an example, the leak detector 100 may be left in place on the top 270 of the pipe 102 until after a concrete slab 316 (shown in FIG. 15) is poured.

The sequence 600 may also include operation 618, which comprises activating the leak detector 100 after placing the float in the liquid. As an example, the leak detector 100 may be activated (powered up in a state ready to detect leaks) by moving the on/off switch 222 to the on position. The sequence may also include operation 620, which comprises testing the leak detector 100, which may be accomplished by pushing a button on the test switch 224, to, for example, cause the audio transducer 206 to sound an alarm.

The sequence 600 may also include operation 622, which comprises detecting if the float (for example the first oblong spheroid 168 and the second oblong spheroid 172) moves at least a third prescribed distance towards the bottom end 305 of the pipe 102. The float may move at least the third prescribed distance toward the bottom end 305 of the pipe 102, due to a decrease in the quantity of the liquid, which may result from a leak in the pipe network 104. The third prescribed distance is the distance that the first end 160 of the dowel 158 must move to cause the actuator arm 202 of the detector switch 200 to move from a position near the body 204 of the detector switch 200 in which the electrical contacts in the detector switch 200 are open, to a position further from the body 204 of the detector switch in which the electrical contacts in the detector switch 200 are closed. As an example, the third prescribed distance may be about 0.5 cm.

If in operation 622 it is detected that the float has moved at least the third prescribed distance toward the bottom end 305 of the pipe 102, then operation 624 is performed. In operation 624, responsive to detecting that the float (for example the first oblong spheroid 168 and the second oblong spheroid 172) has moved at least the third prescribed distance towards the bottom end 305 of the pipe 102, the leak indicator is activated. As an example, activating the leak indicator may comprise sounding an alarm (for example, by activating the audio transducer 206), turning on the indicator light 208, and/or transmitting an electromagnetic signal indicating a leak from the electromagnetic transmitter 210.

If in operation 622 it is not detected that the float has moved at least the third prescribed distance toward the bottom end 305 of the pipe 102, then the sequence 600 may also include operation 626, which comprises putting dirt 308 (shown in FIG. 13) over at least some of the portion of the pipe network 104 that is in the trench 106. Operation 628 comprises detecting if the float (for example the first oblong spheroid 168 and the second oblong spheroid 172) moves at least the third prescribed distance towards the bottom end 305 of the pipe 102. If in operation 628 it is detected that the float has moved at least the third prescribed distance toward the bottom end 305 of the pipe 102, then operation 624, which comprises activating the leak indicator, is performed. If in operation 628 it is not detected that the float has moved at least the third prescribed distance toward the bottom end 305 of the pipe 102, then the sequence 600 may also include operation 630, which comprises placing sand and gravel 314 (shown in FIG. 15, and which may also be referred to as sand and rock) on at least a portion of the dirt 308. Operation 632 comprises detecting if the float (for example the first oblong spheroid 168 and the second oblong spheroid 172) moves at least the third prescribed distance towards the bottom end 305 of the pipe 102. If in operation 632 it is detected that the float has moved at least the third prescribed distance toward the bottom end 305 of the pipe 102, then operation 624, which comprises activating the leak indicator, is performed. If in operation 632 it is not detected that the float has moved at least the third prescribed distance toward the bottom end 305 of the pipe 102, then the sequence 600 may also include operation 634, which comprises pouring concrete on at least a portion of the sand and gravel 314 (shown in FIG. 15). Operation 636 comprises detecting if the float (for example the first oblong spheroid 168 and the second oblong spheroid 172) moves at least the third prescribed distance towards the bottom end 305 of the pipe 102. If in operation 636 it is detected that the float has moved at least the third prescribed distance toward the bottom end 305 of the pipe 102, then operation 624, which comprises activating the leak indicator, is performed. If in operation 636 it is not detected that the float has moved at least the third prescribed distance toward the bottom end 305 of the pipe 102, then operation 636 is repeated.

Because the audio transducer 206, indicator light 208, and/or the electromagnetic transmitter 210 (and/or other devices such as a computer which may be coupled to the leak detector 100) are activated to indicate a leak immediately when a leak occurs, the location of the leak may be determined by observing where construction personnel are working when the audio transducer 206, indicator light 208, and/or the electromagnetic transmitter 210 are activated. Thus, the invention facilitates identifying the location, and the cause, of leaks in waste lines. Because subcontractors that cause a leak can often be identified when the leak detector 100 is used, the general contractor or plumbing contractor may be spared the cost of repairing the leak.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. An apparatus for detecting a lowering of a top surface of a liquid, comprising:
    a housing having a housing hole;
    an insertion member attached to the housing;
    a dowel defining a dowel longitudinal axis, wherein the dowel has a first end and a second end, and wherein the dowel is inserted into the housing hole;
    at least one float attached to the dowel;
    a detector switch having an actuator arm, wherein the detector switch is attached to the housing, and wherein the actuator arm is located proximate the first end of the dowel; and
    an audio transducer attached to the housing; and
    wherein the insertion member has an insertion member hole, wherein the insertion member hole is at least partially aligned with the housing hole;
    wherein the dowel is inserted through the insertion member hole and the housing hole;
    wherein the housing has a lateral surface and a ledge, and wherein the insertion member has a first side face, and wherein the insertion member is attached to the ledge of the housing, wherein the lateral surface of the housing and the first side face of the insertion member are substantially perpendicular to the ledge of the housing, and wherein the longitudinal axis of the dowel is substantially perpendicular to the ledge of the housing; and
    wherein the insertion member has a width, and each float has a width, and wherein the width of the insertion member is at least as large as the width of each float.

2. An apparatus for detecting a lowering of a top surface of a liquid, comprising:
    a housing having a housing hole;
    an insertion member attached to the housing;
    a dowel defining a dowel longitudinal axis, wherein the dowel has a first end and a second end, and wherein the dowel is inserted into the housing hole;
    at least one float attached to the dowel;
    a detector switch having an actuator arm, wherein the detector switch is attached to the housing, and wherein the actuator arm is located proximate the first end of the dowel; and
    an audio transducer attached to the housing; and
    wherein the insertion member has an insertion member hole, wherein the insertion member hole is at least partially aligned with the housing hole;
    wherein the dowel is inserted through the insertion member hole and the housing hole;
    wherein the housing has a lateral surface and a ledge, and wherein the insertion member has a first side face, and wherein the insertion member is attached to the ledge of the housing, wherein the lateral surface of the housing and the first side face of the insertion member are substantially perpendicular to the ledge of the housing, and wherein the longitudinal axis of the dowel is substantially perpendicular to the ledge of the housing;
    wherein the first side face of the insertion member is curved around an axis that is substantially parallel to the longitudinal axis of the dowel; and wherein the insertion member has a second side face, and wherein the second side face is curved around the axis that is substantially parallel to the longitudinal axis of the dowel.

3. An apparatus for detecting a lowering of a top surface of a liquid, comprising:
- a housing having a housing hole;
- an insertion member attached to the housing;
- a dowel defining dowel longitudinal axis, wherein the dowel has a first end and a second end, and wherein the dowel is inserted into the housing hole;
- at least one float attached to the dowel;
- a detector switch having an actuator arm, wherein the detector switch is attached to the housing, and wherein the actuator arm is located proximate the first end of the dowel; and
- an audio transducer attached to the housing; and
- wherein the insertion member has an insertion member hole, wherein the insertion member hole is at least partially aligned with the housing hole;
- wherein the dowel is inserted through the insertion member hole and the housing hole;
- wherein the housing has a lateral surface and a ledge, and wherein the insertion member has a first side face, and wherein the insertion member is attached to the ledge of the housing, wherein the lateral surface of the housing and the first side face of the insertion member are substantially perpendicular to the ledge of the housing, and wherein the longitudinal axis of the dowel is substantially perpendicular to the ledge of the housing; and
- wherein the lateral surface of the housing is curved around a curvature axis that is substantially parallel to the longitudinal axis of the dowel, and wherein the curvature axis is substantially collinear with the longitudinal axis of the dowel.

* * * * *